Patented July 4, 1933

1,916,741

UNITED STATES PATENT OFFICE

RUDOLF SCHMIDT, OF BERLIN-GRUNEWALD, GERMANY, ASSIGNOR TO SCHERING-KAHLBAUM A.-G., OF BERLIN, GERMANY

PRODUCTION OF ALIPHATIC-AROMATIC KETONES

No Drawing. Application filed June 27, 1930, Serial No. 464,325, and in Germany July 9, 1929.

My invention refers to an improvement in the production of aliphatic-aromatic ketones.

As it is well known by passing the vapors of organic acids over suitable catalysts such as thoria or manganous oxide, ketones are produced under the elimination of water and of carbon dioxide (Sabatier, Die Katalyse in der organischen Chemie 1927, pages 253–259). By using in this process the vapors of two different acids mixed ketones can be obtained. If instead of the vapors of acids the vapors of acid anhydrides are passed over the said catalysts the reaction takes place in an analogous manner under the elimination of carbondioxide alone.

It is also known that by passing the vapors of organic acids over certain other catalysts under the elimination of carbondioxide hydrocarbons can be obtained (Sabatier's work above identified, pages 252–253).

I have now found that these two reactions can be combined, if the vapors of aromatic dicarboxylic acids or the anhydrids thereof together with the vapors of aliphatic carbonic acids at temperatures of 300° C.–500° C. are passed over suitable catalysts. Such catalysts are: manganous oxide, calcium oxide, cerium oxide, and others, which may be used for the production of ketones from corresponding acids.

Example 1

150 g. phthalic anhydride and 180 g. acetic acid are evaporated and the vapors are passed through a pipe which is heated to 350°–400° and contains manganous oxide. By condensing the vapors there is obtained a mixture of acetone and acetophenone, from which by fractionate distillation 100 g. acetophenone can be separated.

The reaction occurs according to the equation:

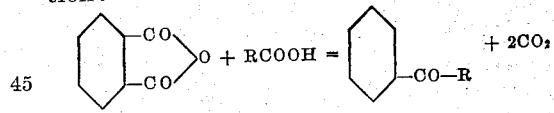

If instead of 150 g. phthalic anhydride 166 g. phthalic acid are used, the same result is obtained and the reaction takes place according to the equation:

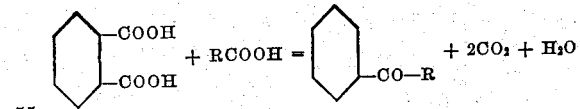

Example 2

According to Example 1, 150 g. phthalic anhydride and 180 g. acetic acid are passed over calcium-oxide at a temperature between 300°–500° C. The result is the same as obtained in Example 1.

Various changes may be made in the details disclosed in the foregoing specification without departing from the invention or sacrificing the advantages thereof.

I claim:—

1. A process for the production of acetophenone comprising passing the vapors of aromatic compounds of the class consisting of phthalic acid and phthalic anhydride together with the vapors of acetic acid at temperatures of 300° to 500° C. over catalysts which may be used for the production of ketones from corresponding acids.

2. A process for the production of acetophenone comprising passing the vapors of phthalic anhydride and acetic acid at temperatures of 300° to 500° C. over catalysts which may be used for the production of ketones from corresponding acids.

3. A process for the production of acetophenone comprising passing the vapors of phthalic anhydride and acetic acid at temperatures of 300° to 500° C. over manganous oxides.

4. A process for the production of acetophenone comprising passing the vapors of aromatic compounds of the class consisting of phthalic acid and anhydride, together with the vapors of acetic acid at a temperature of 300° to 500° C. over catalysts comprising essentially manganous oxide.

5. A process for the production of acetophenone comprising passing the vapors of aromatic compounds of the class consisting of phthalic acid and anhydride, together with the vapors of acetic acid at a temperature of 300° to 500° C. over catalysts comprising essentially calcium oxide.

6. A process for the production of acetophenone comprising passing the vapors of aromatic compounds of the class consisting of phthalic acid and anhydride, together with the vapors of acetic acid at a temperature of 300° to 500° C. over catalysts comprising essentially cerium oxide.

RUDOLF SCHMIDT.